US012057306B2

(12) United States Patent
Dziekonski

(10) Patent No.: US 12,057,306 B2
(45) Date of Patent: Aug. 6, 2024

(54) INCEPTION ELECTROSTATIC LINEAR ION TRAP

(71) Applicant: DH TECHNOLOGIES DEVELOPMENT PTE. LTD., Singapore (SG)

(72) Inventor: Eric Thomas Dziekonski, Richmon Hill (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 540 days.

(21) Appl. No.: 17/312,900

(22) PCT Filed: Dec. 9, 2019

(86) PCT No.: PCT/IB2019/060573
§ 371 (c)(1),
(2) Date: Jun. 10, 2021

(87) PCT Pub. No.: WO2020/121166
PCT Pub. Date: Jun. 18, 2020

(65) Prior Publication Data
US 2022/0068624 A1 Mar. 3, 2022

(51) Int. Cl.
*H01J 49/42* (2006.01)
*H01J 49/06* (2006.01)
*H01J 49/02* (2006.01)

(52) U.S. Cl.
CPC ........ *H01J 49/4245* (2013.01); *H01J 49/065* (2013.01); *H01J 49/027* (2013.01)

(58) Field of Classification Search
CPC ........ H01J 49/00; H01J 49/02; H01J 49/4245; H01J 49/06; H01J 49/062; H01J 49/065; H01J 49/027
(Continued)

(56) References Cited

U.S. PATENT DOCUMENTS

| | | | | |
|---|---|---|---|---|
| 5,880,466 A | 3/1999 | Benner | | |
| 8,766,174 B1 * | 7/2014 | Baykut | H01J 49/38 | 250/282 |

(Continued)

OTHER PUBLICATIONS

International Search Report and Written Opinion for PCT/IB2019/060573, mailed Feb. 14, 2020.

(Continued)

*Primary Examiner* — Jason L McCormack
(74) *Attorney, Agent, or Firm* — Reza Mollaaghababa; Potomac Law Group, PLLC

(57) ABSTRACT

An ELIT includes voltage sources (1101), switches (1102), a first set of electrode plates (1110) aligned along a central axis, and a second set of electrode plates (1120) aligned along the central axis with the first set. A first group of plates (310, 320; 810, 820) of the first set and the second set is positioned to trap ions within a first path length (340, 940). A second group of plates (410, 420) of the first set and the second set is positioned to trap ions within a shorter second path length (440, 1040). The switches select the first path length by applying voltages from the voltage sources to the first set and the second set that cause the first group of plates to trap ions within the first path length. Alternatively, the switches can select the second path length by applying voltages that cause the second group of plates to trap ions within the second path length.

15 Claims, 13 Drawing Sheets

(58) Field of Classification Search
USPC ................................ 250/281, 282, 290, 293
See application file for complete search history.

(56) References Cited

U.S. PATENT DOCUMENTS

2004/0026613 A1* 2/2004 Bateman .............. H01J 49/004 250/281
2009/0014637 A1* 1/2009 Giles .................. H01J 49/4235 250/281

OTHER PUBLICATIONS

Johnson Joshua et al. "A Miniaturized Fourier Transform Electrostatics Linear Ion Trap Mass Spectrometer: Mass Range and Resolution," Journal of the American Society for Mass Spectrometry, Elsevier Science Inc, U.S., vol. 30, No. 4, Feb. 12, 2019, pp. 588-594, XP036748499, ISSN: 1044-0305.

* cited by examiner

INCEPTION ELECTROSTATIC LINEAR ION TRAP

RELATED APPLICATIONS

This application claims the benefit of U.S. Provisional Patent Application Ser. No. 62/779,363, filed on Dec. 13, 2018, the content of which is incorporated by reference herein in its entirety.

INTRODUCTION

The teachings herein relate to single electrostatic linear ion trap (ELIT) for a mass spectrometer that can selectively mass analyze a wide mass-to-charge ratio (m/z) range with a low resolution or a narrower m/z range with a higher resolution. More specifically, an ELIT includes additional axial electrode plates so that applying voltages selectively to one of two or more different groups of axially aligned electrode plates causes ions to be trapped along one of two or more different ion path lengths.

The apparatus and methods disclosed herein can be performed in conjunction with a processor, controller, microcontroller, or computer system, such as the computer system of FIG. 1.

ELIT-MS

An electrostatic linear ion trap mass spectrometer (ELIT-MS) is a type of mass spectrometer. An ELIT-MS includes an ELIT for performing mass analysis of ions. In an ELIT, electric current induced by oscillating ions in the trap is detected. The measured frequency of oscillation of the ions is used to calculate the m/z of the ions. For example, a Fourier transform is performed on the measured induced current.

Dziekonski et al., Int. J. Mass Spectrom. 410 (2016) p 12-21, (the "Dziekonski Paper") describes an exemplary ELIT. The Dziekonski Paper is incorporated by reference herein.

FIG. 2 is a three-dimensional cutaway perspective view of an exemplary conventional ELIT 200. ELIT 200 is similar to the ELIT of the Dziekonski Paper. ELIT 200 includes first set of electrode plates 210, pickup electrode 215, and second set of electrode plates 220. First set of electrode plates 210 and second set of electrode plates 220 can also be called reflectron plates because they are used to reflect ions. First set of electrode plates 120 and second set of electrode plates 220 include holes in the center. Note that the end electrodes of first set of electrode plates 210 and second set of electrode plates 220 do not include holes in the center. However, this is only for simulation purposes. In an actual device, these end electrodes can include holes in the center for the introduction and removal of ions from ELIT 200. Also, one or more electrodes from the inner side (towards pickup electrode 215) of the first set of electrode plates 210 and second set of electrode plates 220 would be biased such that it acted as an einzel lens, thereby radially focusing the ion beam.

In ELIT 200, ions are introduced axially and oscillate axially between first set of electrode plates 210 and second set of electrode plates 220. Pickup electrode 215 is used to measure the induced image current or image charge produced by the oscillating ions. A Fourier transform (FT) is performed on the digitized signal measured from pickup electrode 215 to obtain the oscillation frequency. From the oscillation frequency or frequencies, the m/z of one or more ions is calculated. Detection can also be performed on the electrode plates, using multiple electrodes, or shaped electrodes.

ELIT m/z Range Versus Resolution Problem

The axial length of an ELIT is directly related to the accepted time-of-flight distance of the ELIT. For traps of reasonable proportions, i.e. less than 10 meters, and for a fixed low-mass cutoff, a longer ELIT can be used to analyze ions across a wider m/z range. However, the axial length of an ELIT is inversely related to resolution for a fixed acquisition time and ion kinetic energy. In other words, a longer ELIT has a lower mass analysis resolution for a given acquisition time and ion kinetic energy. So, it is better to use a longer ELIT to analyze a wider m/z mass range, but it is better to use a shorter ELIT to obtain a higher resolution.

This dichotomy between m/z range and resolution originates from the fact that both ion injection (external) and ion detection occur in the axial dimension. In general, the average kinetic energy (average velocity) of ions injected into an ELIT is fixed by the injection method, electrode geometries, and trapping potentials. As a result, ions in the ELIT oscillate back and forth along the axis from end to end with an m/z-specific average velocity. If similar ion energies and plate potentials are used with a longer ELIT, ions will require a longer time to traverse the longer path length. Consequently, the frequency of oscillation is lower. The FT frequency resolution is directly proportional to the frequency of oscillation. Thus, the lower frequency of oscillation produces a lower resolution for a fixed acquisition time. Note that the plate potentials are slightly different in different sized ELITs as the temporal and radial focal points will not be in the same position. Also note that it is possible to offset certain electrodes to compensate for the longer path length.

Therefore, a longer trap is beneficial for generating mass spectra of a broad m/z range, while a smaller trap is beneficial for resolving isobaric compounds, resolving isotopic envelopes for charge states determination, etc. Generally, the only solution to this problem has been to physically remove one trap and replace it with a trap that is appropriately sized to best answer the analytical question of interest. This, however, requires breaking vacuum, days of downtime, and a skilled person.

Another possible solution is to place ELITs of different sizes in parallel. This solution, however, also has a number of downsides. For example, more elements are needed such as multiple deflectors to offset the beam of ions, a preamplifier is needed for each ELIT, and more ion loss is likely.

As a result, additional systems and methods are needed to provide a single ELIT that can selectively analyze a wide m/z range with low resolution or a narrower m/z range with higher resolution.

SUMMARY

An ELIT with a selectable ion path length is disclosed. In addition, a method and a computer program product are disclosed for selecting different ion path lengths in an ELIT.

The ELIT includes one or more voltage sources, a first set of electrode plates, a second set of electrode plates, and one or more switches. The first set of electrode plates is aligned along a central axis. The second set of electrode plates also includes holes in the center and is aligned with the first set along the central axis.

A first group of plates of the first set of plates and the second set of plates is positioned along the central axis to trap ions within a first path length of the central axis. A second group of plates of the first set of plates and the second set of plates is positioned along the central axis to trap ions within a second path length of the central axis that is shorter than the first path length.

The one or more switches select the first path length by applying voltages from the one or more voltage sources to the first set of plates and the second set of plates that cause the first group of plates to trap ions within the first path length. Alternatively, the one or more switches can select the second path length by applying voltages from the one or more voltage sources to the first set of plates and the second set of plates that cause the second group of plates to trap ions within the second path length.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
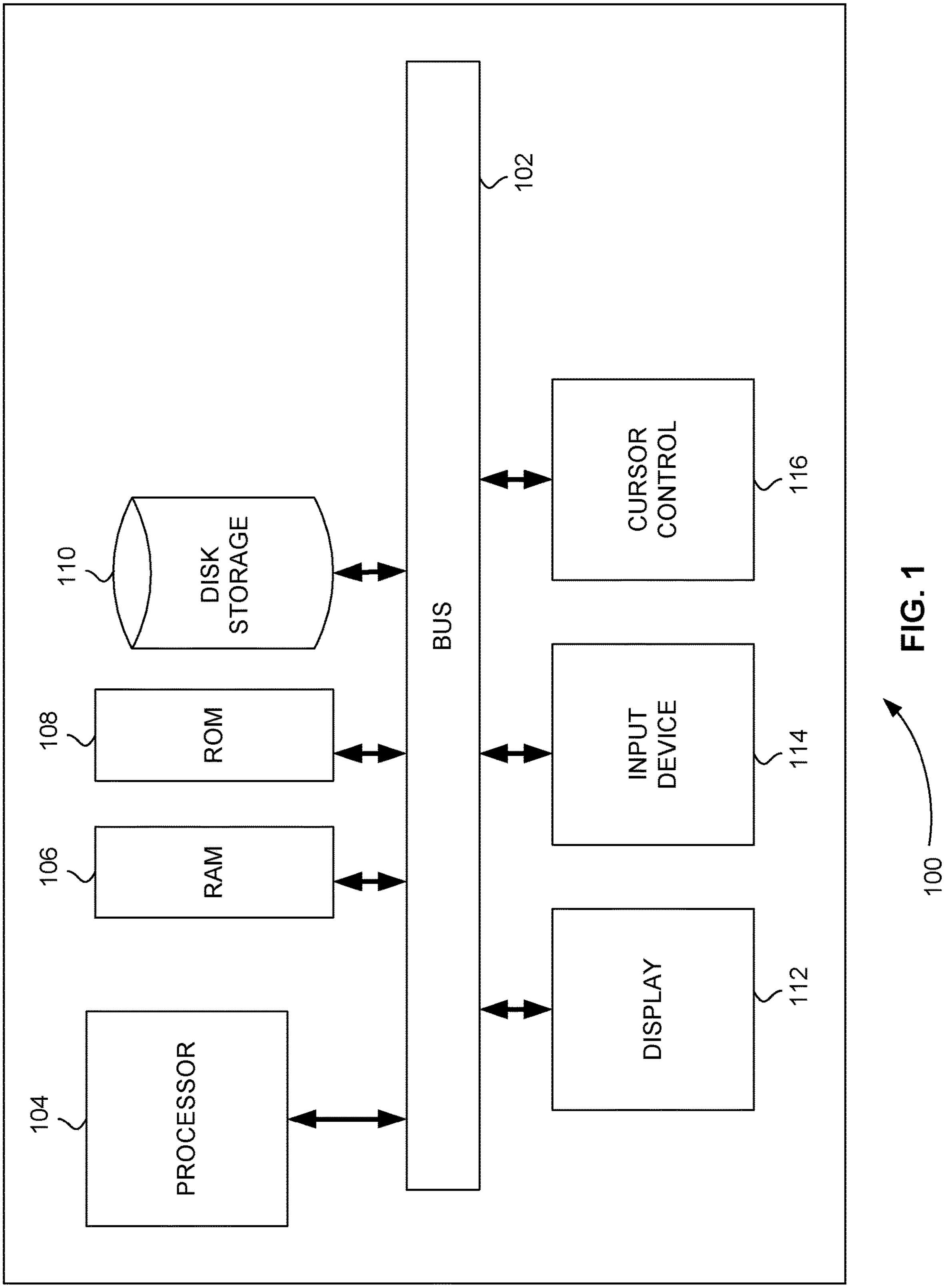
FIG. 1 is a block diagram that illustrates a computer system, upon which embodiments of the present teachings may be implemented.
Figure 2:
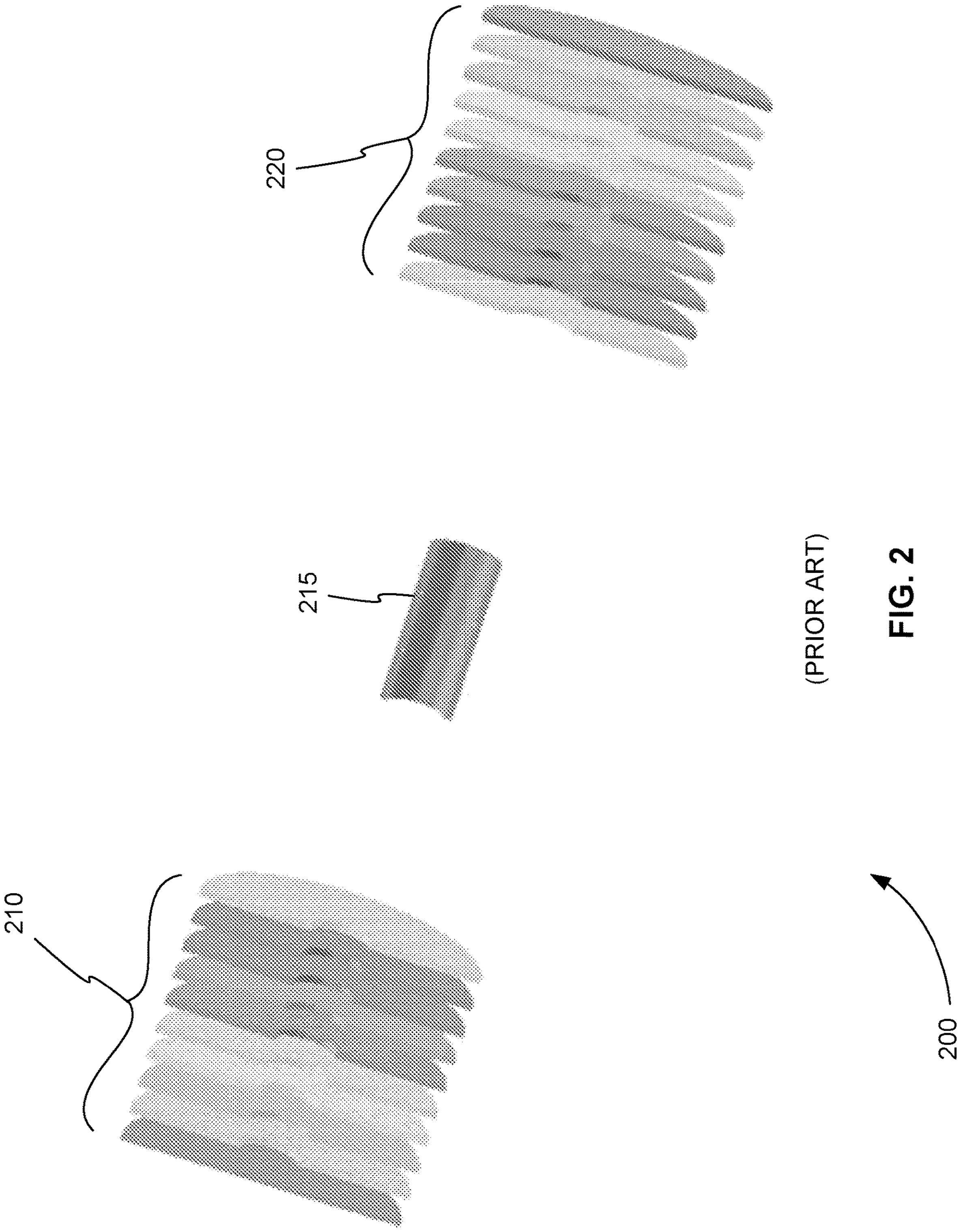
(PRIOR ART) FIG. 2
FIG. 2 is a three-dimensional cutaway perspective view of an exemplary conventional electrostatic linear ion trap (ELIT).

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term “computer-readable medium” as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

ELIT within an ELIT

As described above, the axial length or size of an ELIT is directly related to the accepted m/z range. However, the axial length of an ELIT is inversely related to resolution. As a result, a longer ELIT is better for analyzing a wide mass range with a low resolution, while a shorter ELIT is better for analyzing a narrower mass range with a higher resolution.

One solution to this problem has been to physically remove one trap and replace it with a trap that is appropriately sized to best answer the analytical question of interest. This, however, requires breaking vacuum, days of downtime, and a skilled person. Another possible solution is to place ELITs of different sizes in parallel. This solution, however, also has a number of downsides. For example, more elements are needed such as multiple deflectors to offset the beam of ions, a preamplifier is needed for each ELIT, and more ion loss is likely.

As a result, additional systems and methods are needed to provide a single ELIT that can selectively analyze a wide m/z range with low resolution or a narrower m/z range with higher resolution.

In various embodiments, an ELIT is placed coaxially within an ELIT to provide a single ELIT that can selectively analyze a wide m/z range with low resolution or a narrower m/z range with higher resolution. Both ELITs share the same pickup electrode, although separate detection systems could be used to match the frequency response of the preamplifier to that of the different traps.

Figure 3:
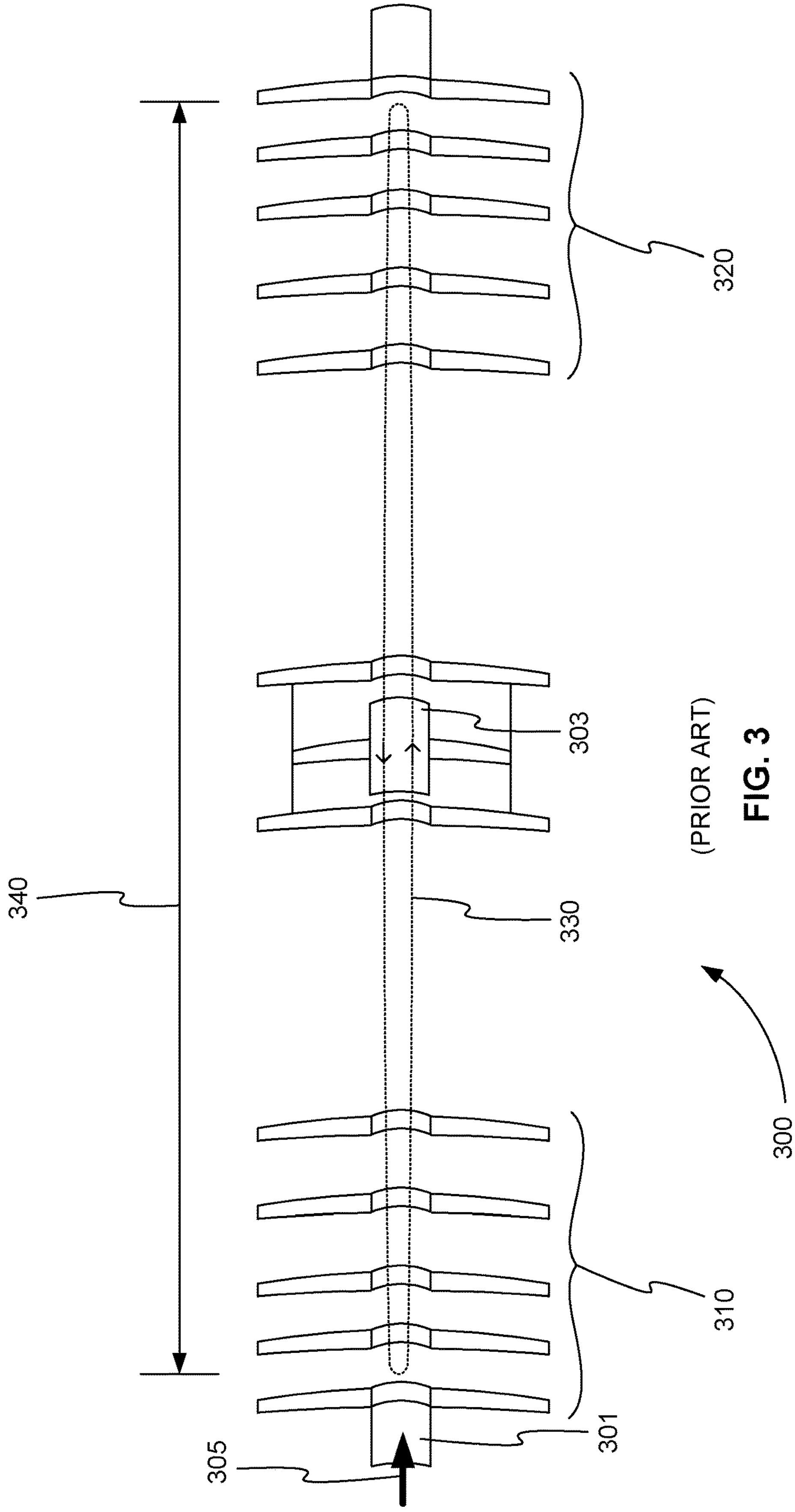
(PRIOR ART) FIG. 3
FIG. 3 is a cutaway side-view of an exemplary conventional ELIT configured to analyze a wide m/z range with low resolution.

FIG. 3 is a cutaway side-view 300 of an exemplary conventional ELIT configured to analyze a wide m/z range with low resolution. In the ELIT of FIG. 3, ions 305 are injected axially through ion inlet 301 and oscillate axially between first set of electrode plates 310 and second set of electrode plates 320 along path 330. Path 330 has ion path length 340, for example. Pickup electrode 303 is used to measure an induced image charge or current produced by the ions oscillating along path 330.

Figure 4:
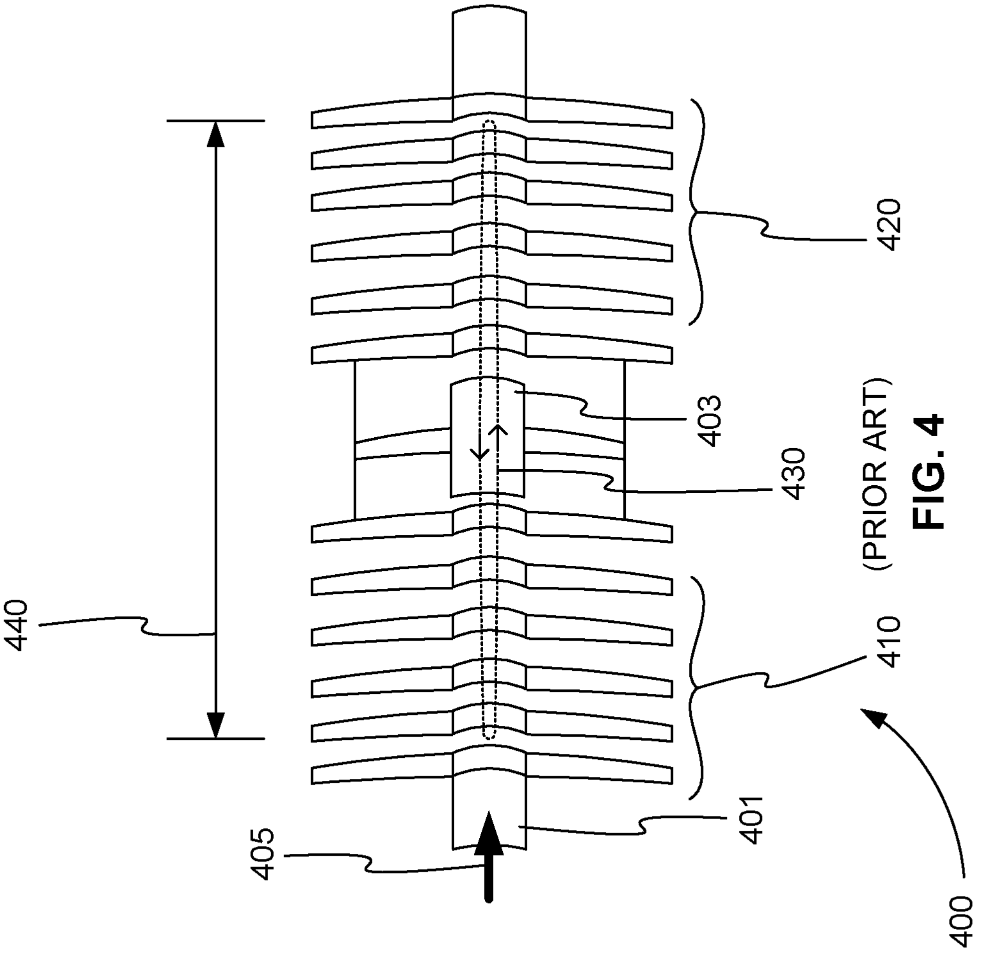
(PRIOR ART) FIG. 4
FIG. 4 is a cutaway side-view of an exemplary conventional ELIT configured to analyze a narrower m/z range than the ELIT of FIG. 3 with a higher resolution.

FIG. 4 is a cutaway side-view 400 of an exemplary conventional ELIT configured to analyze a narrower m/z range than the ELIT of FIG. 3 with a higher resolution. In the ELIT of FIG. 4, ions 405 are injected axially through ion inlet 401 and oscillate axially between first set of electrode plates 410 and second set of electrode plates 420 along path 430. Path 430 has ion path length 440, for example. Pickup electrode 403 is used to measure an induced image charge or current produced by the ions oscillating along path 430. A comparison of the ELIT of FIG. 4 with the ELIT of FIG. 3 shows that the ELIT of FIG. 3 has a much longer ion path length 340 than ion path length 440 of the ELIT of FIG. 4.

Figure 5:
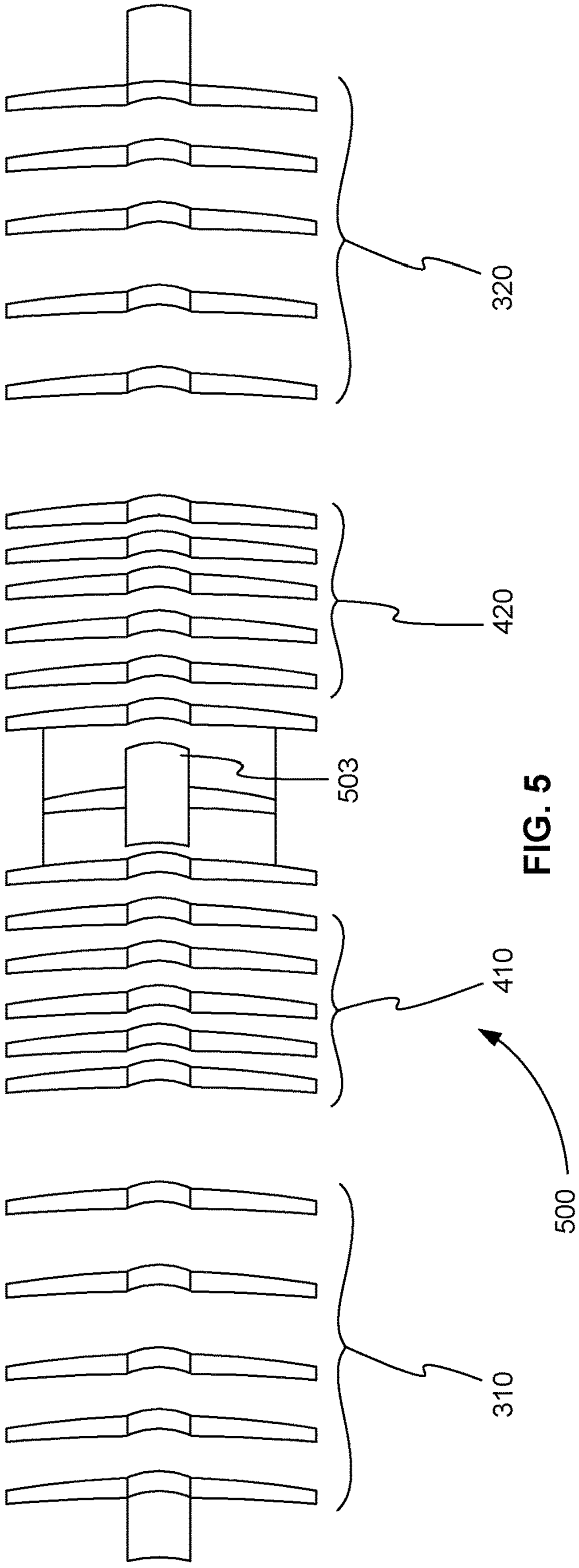
FIG. 5 is a cutaway side-view of an exemplary ELIT that is placed coaxially within an ELIT to provide a single ELIT that can selectively analyze a wide m/z range with low resolution or a narrower m/z range with higher resolution, in accordance with various embodiments.

FIG. 5 is a cutaway side-view 500 of an exemplary ELIT that is placed coaxially within an ELIT to provide a single ELIT that can selectively analyze a wide m/z range with low resolution or a narrower m/z range with higher resolution, in accordance with various embodiments. The single ELIT of FIG. 5 includes first set of electrode plates 310 and second set of electrode plates 320 from the ELIT of FIG. 3 and first set of electrode plates 410 and second set of electrode plates 420 of the ELIT of FIG. 4. Pickup electrode 503 is used to measure an induced image charge or current.

Figure 6:
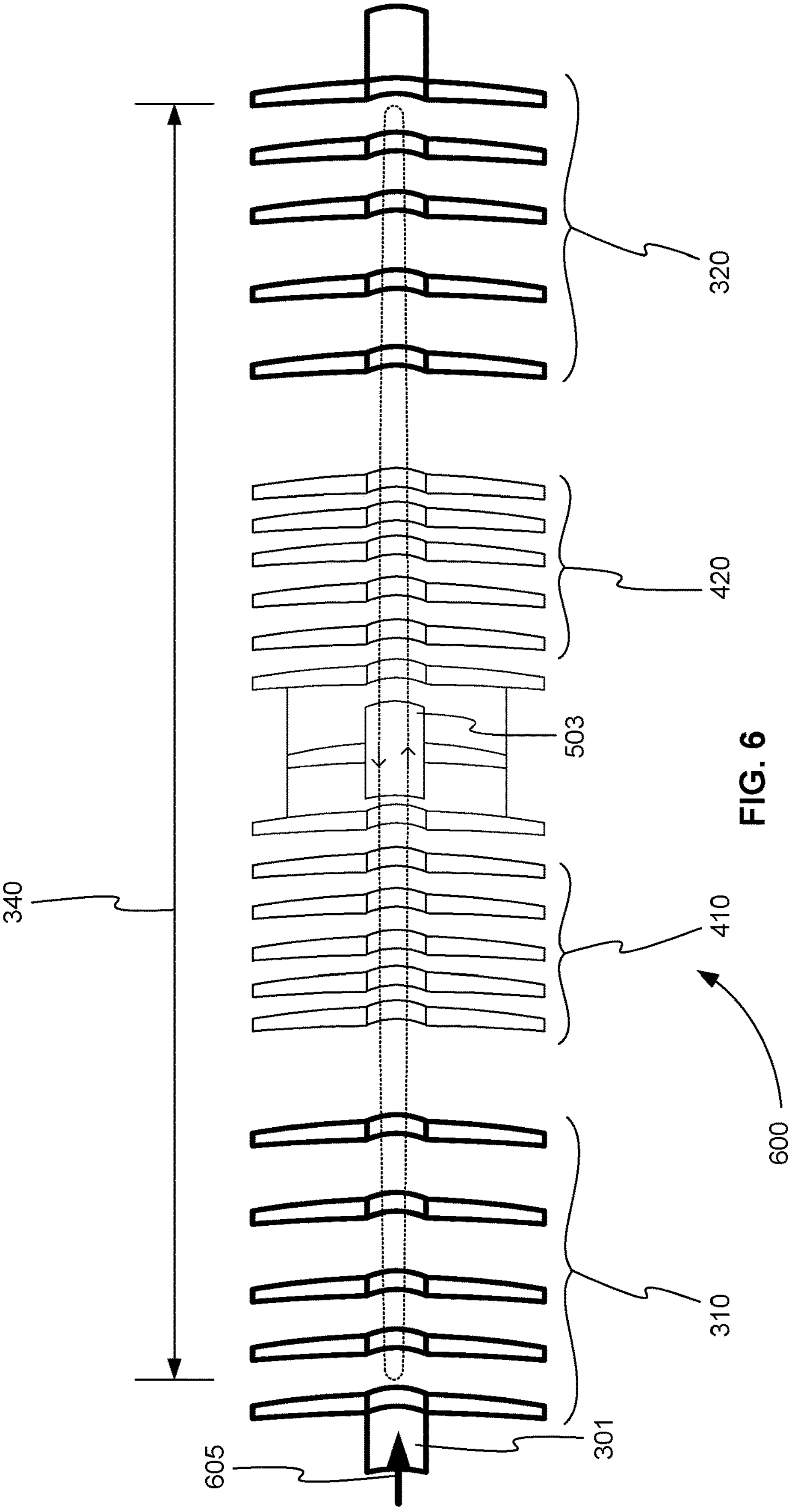
FIG. 6 is a cutaway side-view of the exemplary ELIT of FIG. 5 showing how the ELIT is operated to analyze a wide m/z range with low resolution, in accordance with various embodiments.

FIG. 6 is a cutaway side-view 600 of the exemplary ELIT of FIG. 5 showing how the ELIT is operated to analyze a wide m/z range with low resolution, in accordance with various embodiments. Voltages are applied to a first group of plates to trap ions within first ion path length 340. The first group of plates includes first set of electrode plates 310 and second set of electrode plates 320. Ions 605 are injected axially through ion inlet 301 and oscillate axially between first set of electrode plates 310 and second set of electrode plates 320 along path 330.

A second group of plates includes first set of electrode plates 410 and second set of electrode plates 420. Voltages are applied to the second group of plates so that ions 605 pass through the plates along a stable trajectory. The voltages applied to the second group of plates can be used to alter the time-averaged kinetic energy of ions 605, either increasing or decreasing the oscillation frequency.

Figure 7:
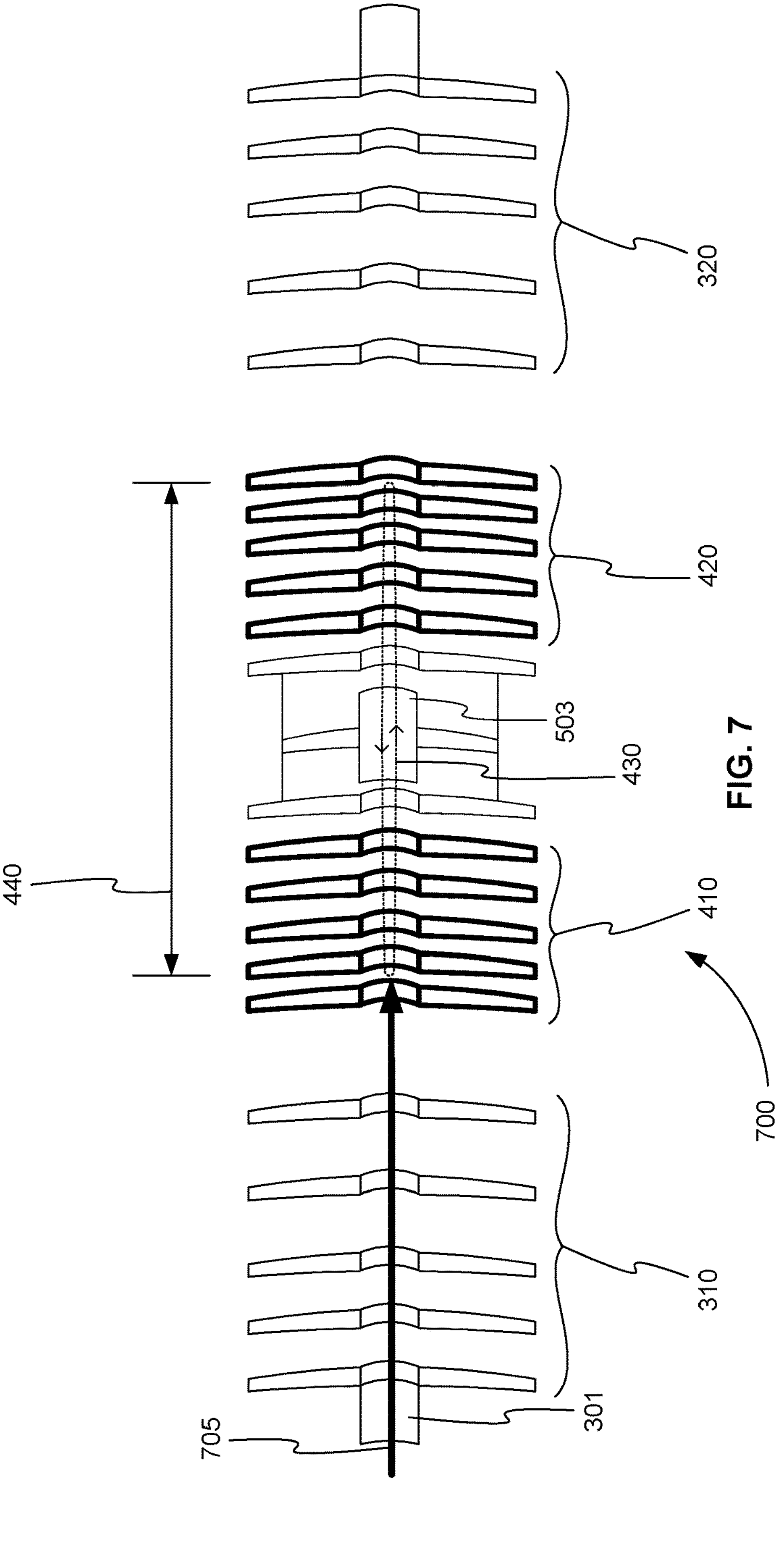
FIG. 7 is a cutaway side-view of the exemplary ELIT of FIG. 5 showing how the ELIT is operated to analyze a narrower m/z range with higher resolution, in accordance with various embodiments.

FIG. 7 is a cutaway side-view 700 of the exemplary ELIT of FIG. 5 showing how the ELIT is operated to analyze a narrower m/z range with higher resolution, in accordance with various embodiments. Voltages are applied to a second group of plates to trap ions within second ion path length 440. The second group of plates includes first set of electrode plates 410 and second set of electrode plates 420. Ions 705 are injected axially through ion inlet 301 and oscillate axially between first set of electrode plates 410 and second set of electrode plates 420 along path 430.

A first group of plates includes first set of electrode plates 310 and second set of electrode plates 320. Voltages are applied to the first group of plates so that they do not participate in the analysis of ions 705. However, the outer plates of the first group of plates can be used to focus ions 705.

The first group of plates and the second group of plates of FIGS. 6 and 7 do not share any plates. In various embodiments, however, the first group of plates and the second group of plates can share plates.

Figure 8:
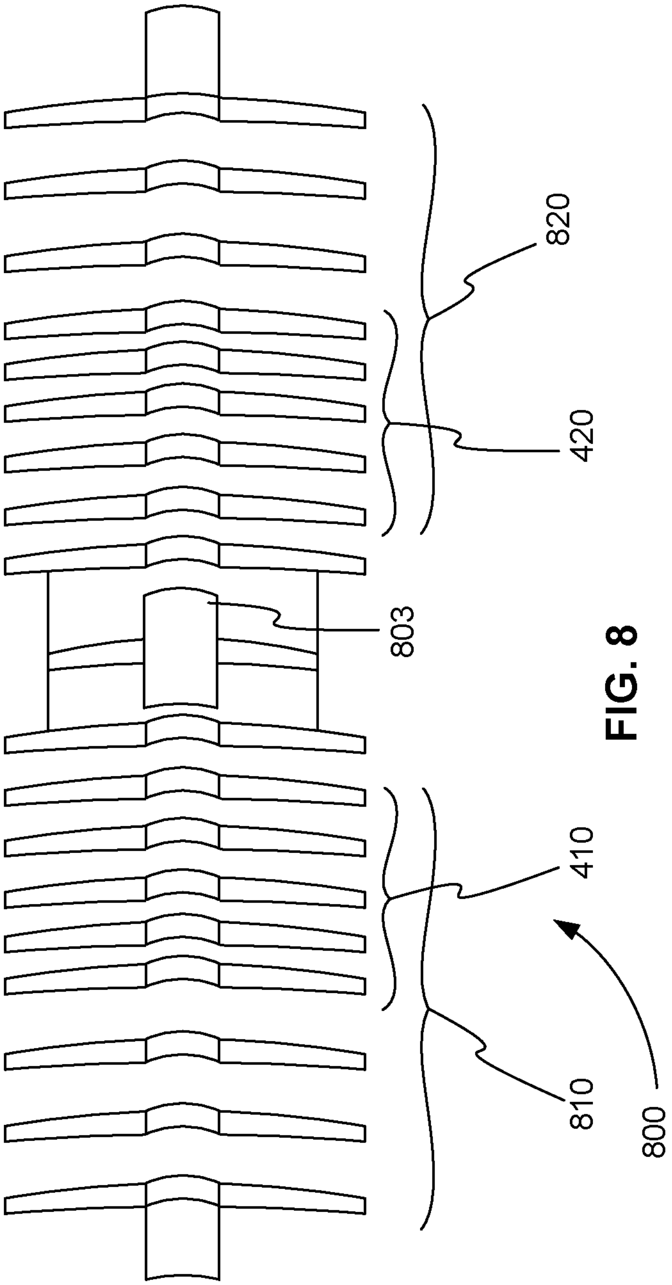
FIG. 8 is a cutaway side-view of an exemplary ELIT where additional plates are added to the ELIT of FIG. 4 to provide a single ELIT that can selectively analyze a wide m/z range with low resolution or a narrower m/z range with higher resolution, in accordance with various embodiments.

FIG. 8 is a cutaway side-view 800 of an exemplary ELIT where additional plates are added to the ELIT of FIG. 4 to provide a single ELIT that can selectively analyze a wide m/z range with low resolution or a narrower m/z range with higher resolution, in accordance with various embodiments. The single ELIT of FIG. 8 includes first set of electrode plates 410 and second set of electrode plates 420 from the ELIT of FIG. 4. Three additional plates are added to first set of electrode plates 410, producing first set of electrode plates 810. Similarly, three additional plates are added to second set of electrode plates 420, producing first set of electrode plates 820. The ELIT of FIG. 8 can selectively analyze a wide m/z range with low resolution or a narrower m/z range with higher resolution by dividing its electrode plates into two groups that share plates.

Figure 9:
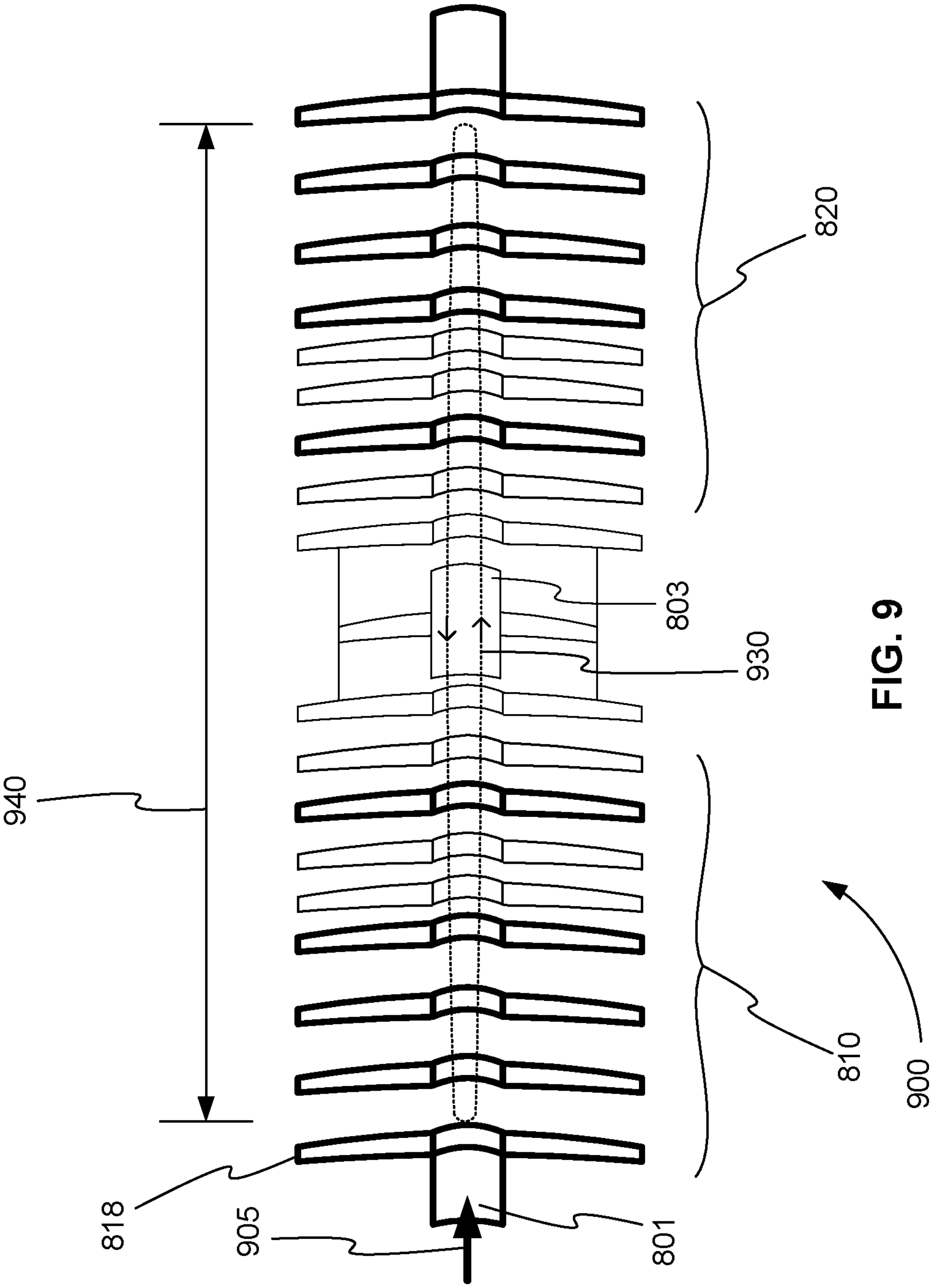
FIG. 9 is a cutaway side-view of the exemplary ELIT of FIG. 8 showing how the ELIT is operated to analyze a wide m/z range with low resolution, in accordance with various embodiments.

FIG. 9 is a cutaway side-view 900 of the exemplary ELIT of FIG. 8 showing how the ELIT is operated to analyze a wide m/z range with low resolution, in accordance with various embodiments. Voltages are applied to a first group of plates (shown with bold lines) of first set of electrode plates 810 and second set of electrode plates 820 to trap ions within first ion path length 940. Ions 905 are injected axially through ion inlet 801 and oscillate axially along path 930. Pickup electrode 803 is used to measure an induced image charge or current from ions 905 of path 930. Voltages are also applied to the other plates of first set of electrode plates 810 and second set of electrode plates 820 so that ions 905 are transmitted through them in a stable manner.

Figure 10:
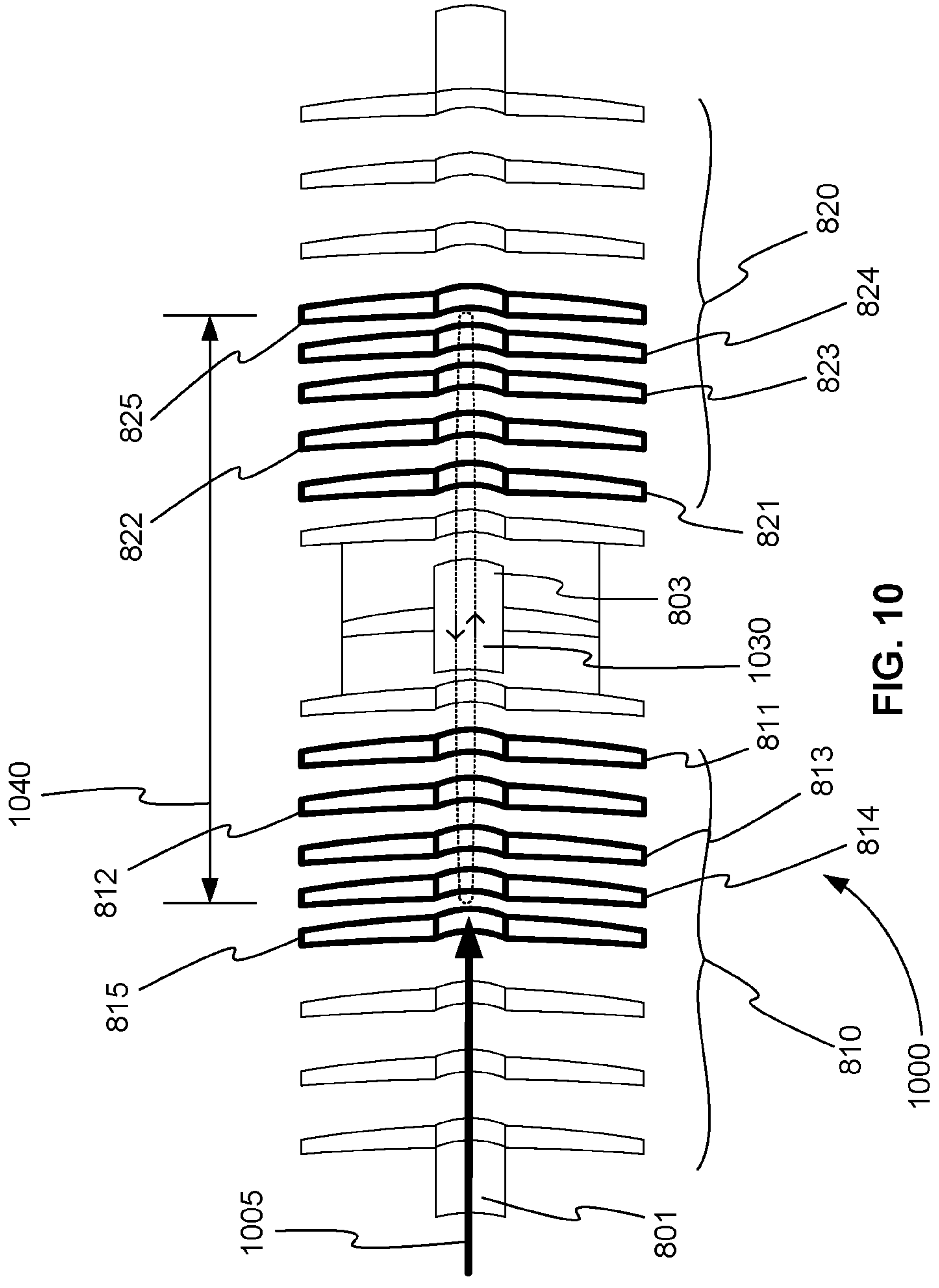
FIG. 10 is a cutaway side-view of the exemplary ELIT of FIG. 8 showing how the ELIT is operated to analyze a narrower m/z range with higher resolution, in accordance with various embodiments.

FIG. 10 is a cutaway side-view 1000 of the exemplary ELIT of FIG. 8 showing how the ELIT is operated to analyze a narrower m/z range with higher resolution, in accordance with various embodiments. Voltages are applied to a second group of plates (shown with bold lines) of first set of electrode plates 810 and second set of electrode plates 820 to trap ions within second ion path length 1040. Ions 1005 are injected axially through ion inlet 801 and oscillate axially along path 1030. Pickup electrode 803 is used to measure an induced image charge or current from ions 1005 of path 1030. Voltages are also applied to the other plates of first set of electrode plates 810 and second set of electrode plates 820 so that they do not participate in the analysis of ions 1005, however, they can be used to focus ions 1005 as they enter or exit the analyzer.

A comparison of FIGS. 9 and 10 shows that the ELIT of FIG. 8 can be used to trap ions along a long first ion path length 940 of FIG. 9 or along a shorter second ion path length 1040 of FIG. 10. FIGS. 9 and 10 also show that applying voltages to two different groups of plates, the first group of plates in FIG. 9 and the second group of plates in FIG. 10, can produce these different path lengths. Finally, FIGS. 9 and 10 show that the first group of plates in FIG. 9 and the second group of plates in FIG. 10 can share plates 812, 815, 822, and 825. In some sense, plates 811, 812, 813, 814, 815, 821, 822, 823, 824, and 825 are shared between the both structures. The larger ELIT still needs voltages applied to all of those plates to operate.

The operation of the ELIT of FIG. 8 as shown in FIG. 9 can be referred to as normal operation, for example. As described above, voltages are applied to the first group of plates in FIG. 9 that includes the outermost plates. This increases the path length of ions 905 to first ion path length 940. Relative to a smaller ELIT, this allows for a wider accepted m/z range (broadband detection). However, the measured frequency and resolution/time of ions 905 is lower. Due to the lower frequency spacing, this implementation is more susceptible to space charge and has a lower threshold to peak coalescence. Coalescence occurs when two ions merge due to space charge such that only a single peak is detected rather than two individual peaks.

The operation of the ELIT of FIG. 8 as shown in FIG. 10 can be referred to as a zoom-scan mode (narrowband detection), for example. As described above, voltages are applied to the second group of plates in FIG. 10 that includes the innermost plates. This decreases the path length of ions 1005 to second ion path length 1040. This geometry has a shorter path length, thereby compromising the accepted m/z range. However, ions 1005 have a higher frequency relative to their "normal" frequencies. This increases the observed resolution/time and the threshold for ion coalescence.

It is important to note that although only six plates were added to generate two unique ELIT structures in the ELIT of FIG. 8, any number of plates can be added to generate a plethora of structures. As a result, an ELIT with many different effective path lengths can be made, allowing one device to fit the needs of many customers.

Also, to ease tuning, in various embodiments, the axial spacings of each ELIT structure are proportional to one another. In addition, while as indicated in FIG. 10, when using a zoom-scan mode, the voltages applied to the outermost electrodes are applied so that they do not participate in the analysis of ions 1005, it is likely more useful if the outer electrodes are used to better focus the incoming ion beam.

ELIT with a Selectable Ion Path Length

Figure 11:
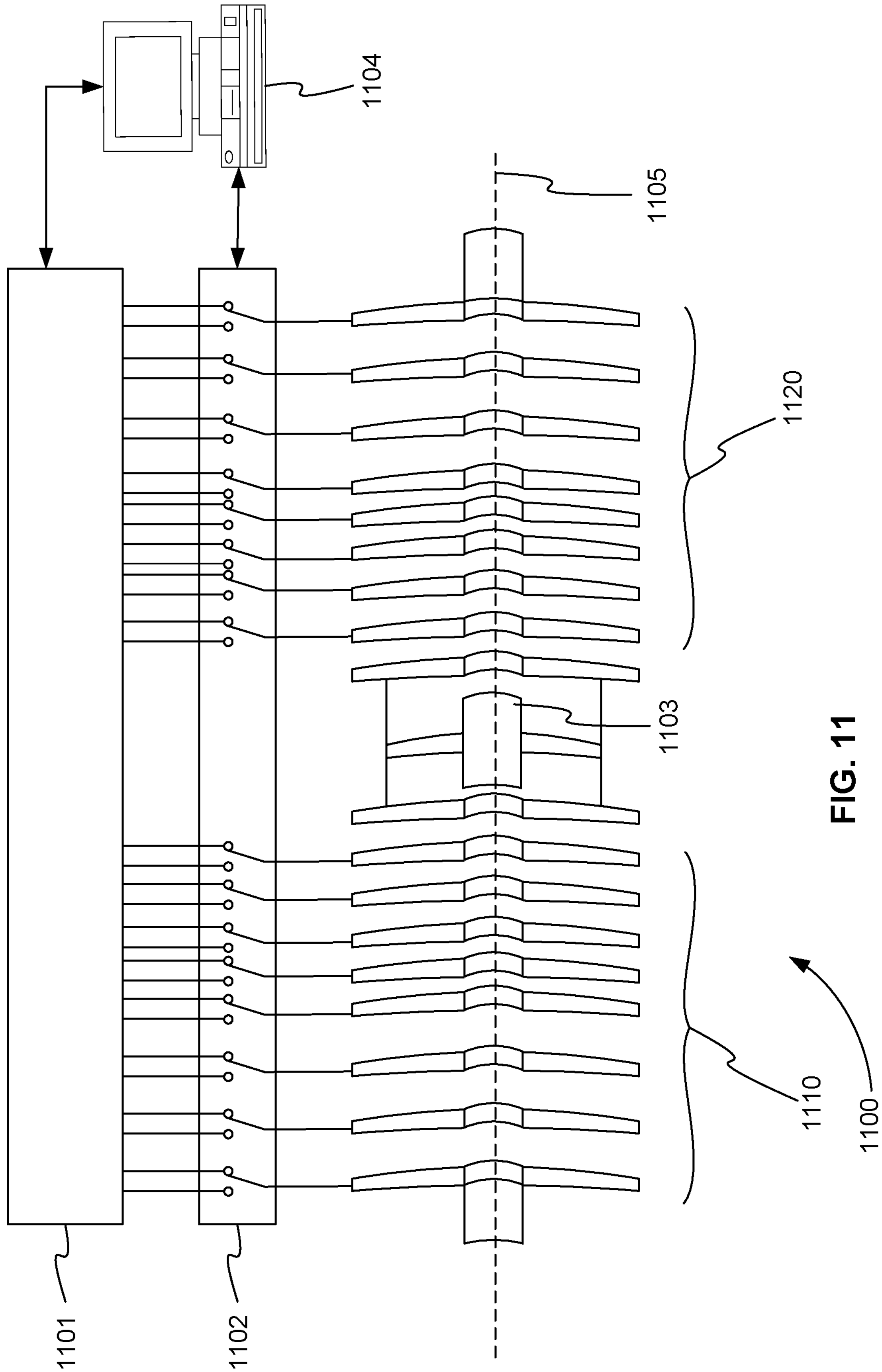
FIG. 11 is a schematic diagram of an ELIT with a selectable ion path length, in accordance with various embodiments.

FIG. 11 is a schematic diagram 1100 of an ELIT with a selectable ion path length, in accordance with various embodiments. The ELIT includes one or more voltage sources 1101, pickup electrode 1103, first set of electrode plates 1110, second set of electrode plates 1120, and one or more switches 1102. Although the ELIT of FIG. 11 includes pickup electrode 1103, detection can also be performed using first set of electrode plates and second set of electrode plates 1120, using multiple electrodes (not shown), or shaped electrodes (not shown).

First set of electrode plates 1110 is aligned along central axis 1105. Second set of electrode plates 1120 also includes holes in the center and is aligned with first set of electrode plates 1110 along central axis 1105.

A first group of plates of first set of plates 1110 and second set of plates 1120 is positioned along central axis 1105 to trap ions within a first path length of central axis 1105. A first group of plates positioned to trap ions within a first path length is shown, for example, in bold in FIG. 9.

Returning to FIG. 11, a second group of plates of first set of plates 1110 and second set of plates 1120 is positioned along central axis 1105 to trap ions within a second path length of central axis 1105 that is shorter than the first path length. A second group of plates positioned to trap ions within a second path length shorter than the first path length is shown, for example, in bold in FIG. 10.

Returning to FIG. 11, one or more switches 1102 select the first path length by applying voltages from one or more voltage sources 1101 to first set of plates 1110 and second set of plates 1120 that cause the first group of plates to trap ions within the first path length. Alternatively, one or more switches 1102 can select the second path length by applying voltages from one or more voltage sources 1102 to first set of plates 1110 and second set of plates 1120 that cause the second group of plates to trap ions within the second path length. One or more switches 1102 can include any type of switch including, but not limited to, an electronic switch or an electro-mechanical switch.

In various embodiments, the first group of plates and the second group of plates do not share any plates. For example, the first group of plates, shown in bold in FIG. 6, does not share any plates with the second group of plates shown in bold in FIG. 7.

Returning to FIG. 11, in various embodiments, the first group of plates and the second group of plates can share two or more plates. For example, the first group of plates shown in bold in FIG. 9 shares four plates (812, 815, 822, and 825) with the second group of plates shown in bold in FIG. 10. Again, in some sense, plates 811, 812, 813, 814, 815, 821, 822, 823, 824, and 825 are shared between both structures. The larger ELIT still needs voltages applied to all of those plates to operate.

Returning to FIG. 11, in various embodiments, the first group of plates and the second group of plates each include trapping plates, plates to change the curvature of the electric field near a turning point, and plates to radially confine ions. For example, the second group of plates shown in bold in FIG. 10 includes trapping plates 815 and 825, plates to change the curvature of the electric field near a turning point 814, 813, 812, 824, 823, and 822, and plates to radially confine ions 811 and 821.

Returning to FIG. 11, in various embodiments, a position along central axis 1105 of each plate in the second group of plates is directly proportional to a position of a corresponding plate in the first group of plates. For example, the distance from trapping plate 818 of the first group of plates to pickup electrode 803 in FIG. 9 is twice the distance from corresponding trapping plate 815 of the second group of plates to pickup electrode 803 in FIG. 10.

As described above, tuning is simplified if locations of the plates in the second group of plates are proportional to the plates in the first group of plates. Specifically, this means that the same voltages can be applied to most of the plates in the two groups. The trapping plates and the plates to change the curvature of the electric field near a turning point only focus the kinetic energy distribution, which is constant when a longer ELIT is used or when a shorter ELIT is used. As a result, if the locations of the plates in the second group of plates are proportional to the plates in the first group of plates, only the voltages of the plates used to radially confine ions should need to be drastically changed when switching between the first group of plates and the second group of plates.

Therefore, in various embodiments, if the locations of the plates in the second group of plates are proportional to the plates in the first group of plates, a voltage applied to a trapping plate of the first group of plates to trap ions within the first path length is the same (or very similar) voltage applied to a corresponding trapping plate of the second group of plates to trap ions within the second path length. Similarly, if the locations of the plates in the second group of plates are proportional to the plates in the first group of plates, a voltage applied to a plate to change the curvature of an electric near a turning point of the first group of plates to trap ions within the first path length is the same (or very similar) voltage applied to a corresponding plate to change the curvature of an electric near a turning point of the second group of plates to trap ions within the second path length.

If the locations of the plates in the second group of plates are proportional to the plates in the first group of plates, only the voltages of the plates used to radially confine ions need to be drastically changed. Specifically, if the locations of the plates in the second group of plates are proportional to the plates in the first group of plates, a voltage applied to a plate to radially confine ions of the first group of plates to trap ions within the first path length is different from a voltage applied to a corresponding plate to radially confine ions of the second group of plates to trap ions within the second path length.

As described above, when the second group of plates is selected to trap ions within a shorter second path length, voltages applied to the outermost electrodes of the first group of plates are applied so that they do not participate in the analysis of ions. In various embodiments, however, these plates can be used to focus ions. Specifically, returning to FIG. 11, when one or more switches 1102 select the second path length, voltages applied to one or more plates of the first group of plates cause the one or more plates to focus ions radially outside of the second path length.

In various embodiments, switching between ELITs is done between sample experiments. Specifically, one or more switches 1102 switch between the first path length and the second path length between samples analyses.

In various embodiments, switching between ELITs is done dynamically or in real-time within a single sample experiment. Specifically, one or more switches 1102 switch between the first path length and the second path length within a sample analysis. For example, in a targeted scan, it may be known that a peak of interest is located in a narrow m/z range. If the peak of interest is not resolved using the longer first path length, one or more switches 1102 can switch from the first path length to the second path length to increase the resolution to locate the peak of interest.

In various embodiments, near each trapping point, one trapping plate is needed and a minimum of three plates is needed for changing the curvature of the electric and radially confining ions. As a result, the first group of plates includes at least four plates from the first set and at least four plates from second set, and the second group of plates includes at least four plates from the first set and at least four plates from second set. In various embodiments, it is be possible to use less electrodes if the electrodes are shaped, i.e. they are not represented by a simple cylindrical structure as described, for example, by Hogan, J. A.; Jarrold, M. F. *J. Am. Soc. Mass Spectrom.* 2018, 1-10.

As described above, in various embodiments, any number of plates can be added to an ELIT to create one or more additional ELITs within the ELIT. For example, a third group of plates (not shown) of the first set of plates 1110 and the second set of plates 1120 can be positioned along central axis 1105 to trap ions within a third path length of central axis 1105 that is shorter than the second path length. One or more switches 1102 can select the third path length by applying different separate voltages from one or more voltage sources 1101 to the first set of plates 1110 and the second set of plates 1120 that cause the third group of plates to trap ions within the third path length.

In various embodiments, processor 1104 is used to control or provide instructions to one or more switches 1102 and to one or more voltage sources 1101 and to analyze data collected. Processor 1104 controls or provides instructions by, for example, controlling one or more voltage, current, or pressure sources (not shown) or by applying currents or voltages. Processor 1104 can be a separate device as shown in FIG. 11 or can be a processor or controller of one or more devices of a mass spectrometer (not shown). Processor 1104 can be, but is not limited to, a controller, a computer, a microprocessor, the computer system of FIG. 1, or any device capable of sending and receiving control signals and data.

Method for Selecting Different ELIT Ion Path Lengths

Figure 12:
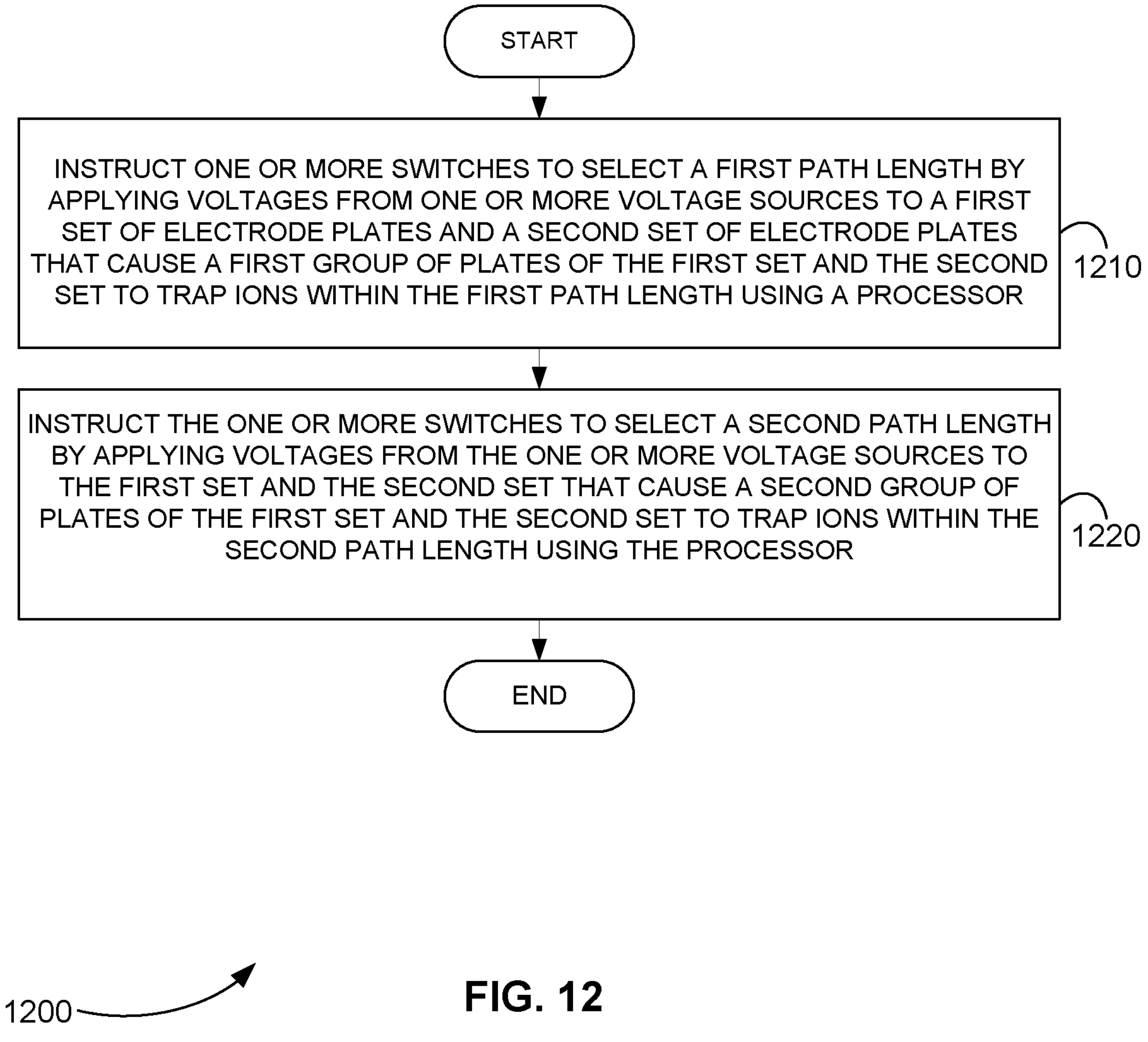
FIG. 12 is a flowchart showing a method for selecting different ion path lengths in an ELIT, in accordance with various embodiments.

FIG. 12 is a flowchart showing a method 1200 for selecting different ion path lengths in an ELIT, in accordance with various embodiments.

In step 1210 of method 1200, one or more switches are instructed to select a first path length by applying voltages from one or more voltage sources to a first set of electrode plates and a second set of electrode plates that cause a first group of plates of the first set of plates and the second set of plates to trap ions within the first path length using a processor. The plates of the first set include holes in center and are aligned along a central axis. The plates of the second set include holes in center and are aligned along the central axis with the first set. The first group of plates is positioned along the central axis to trap ions within the first path length of the central axis. A second group of plates of the first set of plates and the second set of plates is positioned along the central axis to trap ions within a second path length of the central axis that is shorter than the first path length.

In step 1210, the one or more switches are instructed to select a second path length by applying voltages from the one or more voltage sources to the first set of plates and the second set of plates that cause the second group of plates to trap ions within the second path length using the processor.

Computer Program Product for Selecting Different ELIT Ion Path Lengths

In various embodiments, computer program products include a tangible computer-readable storage medium whose contents include a program with instructions being executed on a processor so as to perform a method for selecting different ion path lengths in an ELIT. This method is performed by a system that includes one or more distinct software modules.

Figure 13:
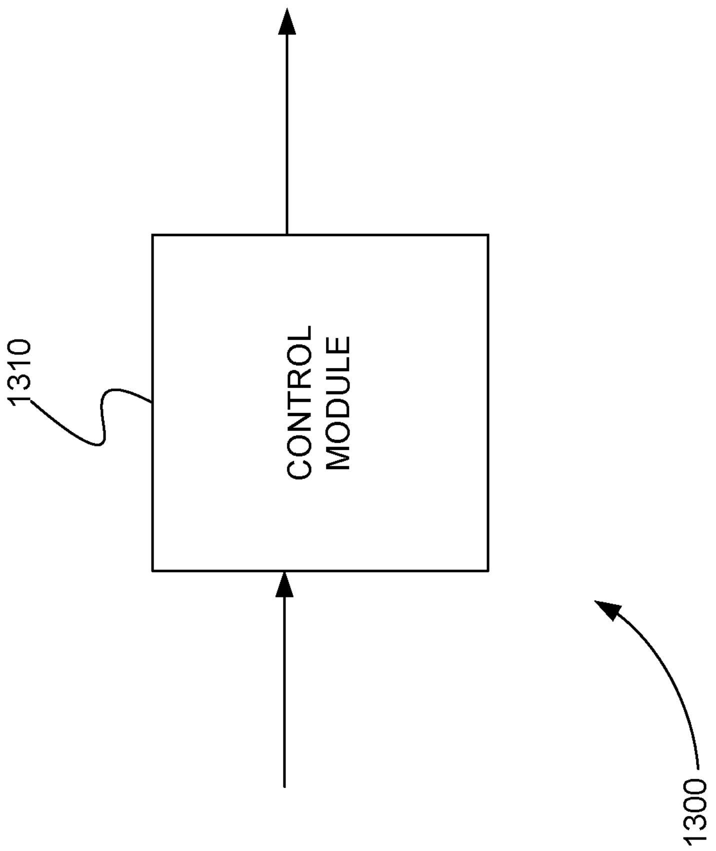
FIG. 13 is a schematic diagram of a system that includes one or more distinct software modules that perform a method for selecting different ion path lengths in an ELIT, in accordance with various embodiments.

FIG. 13 is a schematic diagram of a system 1300 that includes one or more distinct software modules that perform a method for selecting different ion path lengths in an ELIT, in accordance with various embodiments. System 1300 includes a control module 1310.

Control module 1310 instructs one or more switches to select a first path length by applying voltages from one or more voltage sources to a first set of electrode plates and a second set of electrode plates that cause a first group of plates of the first set and the second set to trap ions within the first path length. The plates of the first set include holes in center and are aligned along a central axis. The plates of the second set include holes in center and are aligned along the central axis with the first set. The first group of plates is positioned along the central axis to trap ions within the first path length of the central axis. A second group of plates of the first set and the second set is positioned along the central axis to trap ions within a second path length of the central axis that is shorter than the first path length.

Control module 1310 instructs the one or more switches to select the second path length by applying voltages from the one or more voltage sources to the first set and the second set that cause the second group of plates set to trap ions within the second path length.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An electrostatic linear ion trap (ELIT) with a selectable ion path length, comprising:

one or more voltage sources;

a first set of electrode plates with holes in the center aligned along a central axis;

a second set of electrode plates with holes in the center that is aligned along the central axis with the first set, wherein a first group of plates of the first set and the second set of electrode plates is positioned along the central axis to cause ions to oscillate axially within a first path length of the central axis and a second group of plates of the first set and the second set of electrode plates is positioned along the central axis to cause the ions to oscillate axially within a second path length of the central axis that is shorter than the first path length;

a path length selection controller comprising one or more switches that select the first path length by applying voltages from the one or more voltage sources to the first set and the second set of electrode plates that cause the first group of plates to trap the ions into a first axial oscillation path within the first path length and that select the second path length by applying voltages from the one or more voltage sources to the first set and the second set that cause the second group of plates to trap the ions into a second axial oscillation path within the second path length; and a central pickup electrode that measures induced image current or induced image charge, produced by the axially oscillating ions, at an m/z resolution that depends on the path length selected.

2. The ELIT of claim 1, wherein the first group of plates and the second group of plates do not share any plates.

3. The ELIT of claim 1, wherein the first group of plates and the second group of plates share two or more plates.

4. The ELIT of claim 1, wherein the first group of plates and the second group of plates each include trapping plates, plates to change the curvature of the electric field near a turning point, and plates to radially confine ions.

5. The ELIT of claim 4, wherein a position along the central axis of each plate in the second group of plates is directly proportional to a position of a corresponding plate in the first group of plates.

6. The ELIT of claim 5, wherein a voltage applied to a trapping plate of the first group of plates to trap ions within the first path length is the same voltage applied to a corresponding trapping plate of the second group of plates to trap ions within the second path length.

7. The ELIT of claim 5, wherein a voltage applied to a plate to change the curvature of an electric field near a turning point of the first group of plates to trap ions within the first path length is the same voltage applied to a corresponding plate to change the curvature of the electric field near a turning point of the second group of plates to trap ions within the second path length.

8. The ELIT of claim 5, wherein a voltage applied to a plate to radially confine ions of the first group of plates to trap ions within the first path length is different from a voltage applied to a corresponding plate to radially confine ions of the second group of plates to trap ions within the second path length.

9. The ELIT of claim 1, wherein, when the one or more switches select the second path length by applying voltages to the second group of plates, other voltages applied to one or more plates from the first group of plates cause the one or more plates to focus ions radially outside of the second path length.

10. The ELIT of claim 1, wherein the one or more switches switch between the first path length and the second path length between samples analyses.

11. The ELIT of claim 1, wherein the switch switches between the first path length and the second path length within a sample analysis.

12. The ELIT of claim 1, wherein the first group of plates includes at least four plates from the first set and at least four plates from second set and wherein the second group of plates includes at least four plates from the first set and at least four plates from second set.

13. The ELIT of claim 1, wherein a third group of plates of the first set and the second set are positioned along the central axis to trap ions within a third path length of the central axis that is shorter than the second path length and wherein the one or more switches select the third path length by applying different separate voltages from the one or more voltage sources to the first set and the second set that cause the third group of plates to trap ions within the third path length.

14. A method for selecting different ion path lengths in an electrostatic linear ion trap (ELIT), comprising:

controlling, using a processor-based device, one or more switches to select a first path length by applying voltages from one or more voltage sources to a first set of electrode plates and a second set of electrode plates that cause a first group of plates of the first set of electrode plates and the second set of electrode plates to trap ions into a first axial oscillation path within the first path length, wherein the plates of the first set of electrode plates include holes in center and are aligned along a central axis, wherein the plates of the second set of electrode plates include holes in center and are aligned along the central axis with the first set, and wherein the first group of plates is positioned along the central axis to cause the ions to oscillate axially within the first path length of the central axis and a second group of plates of the first set and the second set of electrode plates is positioned along the central axis to cause the ions to oscillate axially within a second path length of the central axis that is shorter than the first path length;

controlling, using the processor-based device, the one or more switches to select the second path length by applying voltages from the one or more voltage sources to the first set and the second set of electrode plates that cause the second group of plates to trap ions into a second axial oscillation path within the second path length; and measuring, by a central pickup electrode, induced image current or induced image charge, produced by the axially oscillating ions, at an m/z resolution that depends on the path length selected.

15. A computer program product, comprising a non-transitory and tangible computer-readable storage medium whose contents include a program with instructions being executed on a processor to perform a method for selecting different ion path lengths in an electrostatic linear ion trap (ELIT), the method comprising:

providing a system, wherein the system comprises one or more distinct software modules, and wherein the distinct software modules comprise a control module;

controlling, using the control module, one or more switches to select a first path length by applying voltages from one or more voltage sources to a first set of electrode plates and a second set of electrode plates that cause a first group of plates of the first set of electrode plates and the second set of electrode plates to trap ions into a first axial oscillation path within the first path length, wherein the plates of the first set of electrode plates include holes in center and are aligned along a central axis, wherein the plates of the second set of electrode plates include holes in center and are aligned along the central axis with the first set of electrode plates, and wherein the first group of plates is positioned along the central axis to trap ions within the first path length of the central axis and a second group of plates of the first set of electrode plates and the second set of electrode plates is positioned along the central axis to trap ions within a second path length of the central axis that is shorter than the first path length;

controlling, using the control module, the one or more switches to select the second path length by applying voltages from the one or more voltage sources to the first set and the second set of electrode plates that cause the second group of plates set to trap the ions into a second axial oscillation within the second path length; and measuring, by a central pickup electrode, induced image current or induced image charge, produced by the axially oscillating ions, at an m/z resolution that depends on the path length selected.

* * * * *